United States Patent [19]

Austin et al.

[11] Patent Number: 5,531,407

[45] Date of Patent: Jul. 2, 1996

[54] APPARATUS AND METHOD FOR CONTROLLING THE SHAPE OF STRUCTURES

[75] Inventors: Fred Austin, Commack; Gareth J. Knowles, Smithtown; Michael J. Rossi, Huntington, all of N.Y.

[73] Assignee: Grumman Aerospace Corporation, Los Angeles, Calif.

[21] Appl. No.: 277,416

[22] Filed: Jul. 18, 1994

Related U.S. Application Data

[63] Continuation of Ser. No. 58,861, May 6, 1993, abandoned.

[51] Int. Cl.$^6$ .................................................. B64C 3/44
[52] U.S. Cl. .................................................. 244/219
[58] Field of Search .................................. 244/203, 219, 244/216, 75 R, 76 R, 194, 195, 75 A

[56] References Cited

U.S. PATENT DOCUMENTS

| | | | |
|---|---|---|---|
| 3,076,623 | 2/1963 | Lyon | 244/219 |
| 3,734,432 | 5/1973 | Low | 244/75 A |
| 3,911,345 | 10/1975 | Totten | 244/195 |
| 4,236,685 | 12/1980 | Kissel | 244/195 |
| 4,296,900 | 10/1981 | Krall | 244/219 |
| 4,349,169 | 9/1982 | McNally | 244/219 |
| 4,706,902 | 11/1987 | Destuynder et al. | 244/195 |
| 4,725,020 | 2/1988 | Whitener | 244/76 R |
| 4,741,503 | 5/1988 | Anderson et al. | 244/219 |
| 4,796,192 | 1/1989 | Lewis | 244/76 R |
| 4,899,284 | 2/1990 | Lewis et al. | 244/219 |
| 4,922,096 | 5/1990 | Brennan | 244/76 R |
| 5,082,207 | 1/1992 | Tulinius | 244/219 |
| 5,135,186 | 8/1992 | Ako | 244/195 |
| 5,374,011 | 12/1994 | Lazarus et al. | 244/195 |

FOREIGN PATENT DOCUMENTS

| | | | |
|---|---|---|---|
| 4007694 | 9/1991 | Germany | 244/219 |
| 2096551 | 10/1982 | United Kingdom | 244/203 |

*Primary Examiner*—Galen L. Barefoot
*Attorney, Agent, or Firm*—Terry J. Anderson; Karl J. Hoch, Jr.

[57] ABSTRACT

An apparatus and method control the shape of a structure with one or more surfaces and internal actuators. A plurality of translational actuators are capable of extending and contracting. The structure can have any number of controllable surfaces, including one. The shapes of the surfaces are controlled by computing the actuator strokes or loads required for achieving specified surface deflections. There are two methods for accomplishing this control. In the actuator stroke-control method, the surface deflections, or deflection errors for closed-loop control, are multiplied by a stroke-control gain matrix which is a function of the properties of the structure with the actuators absent. In the actuator load-control method, the surface deflections, or deflection errors for closed-loop control, are multiplied by a load-control gain matrix which is a function of the properties of the structure with the actuators absent. The control gain matrices minimize the surface shape errors. Ratios of stresses to allowable values are continuously monitored throughout the structure and corrective action is taken to prevent an overstressed condition.

27 Claims, 4 Drawing Sheets

| Upper Surface | Lower Surface |
|---|---|
| 0.003 | 0.000 |
| −0.003 | −0.002 |
| −0.003 | −0.000 |
| −0.000 | −0.007 |
| −0.004 | −0.005 |
| −0.004 | −0.000 |
| −0.005 | −0.008 |

APPARATUS AND METHOD FOR CONTROLLING THE SHAPE OF STRUCTURES

CROSS-REFERENCE TO RELATED APPLICATION

This is a continuation of U.S. patent application Ser. No. 08/058,861, filed May 6, 1993, now abandoned.

BACKGROUND OF THE INVENTION

1. Field of the Invention

The present invention relates to an apparatus and a method for controlling the shape of structures. More particularly, the invention relates to an apparatus and a method for controlling the shape of structures for adaptive wings, hydrodynamic lifting surfaces, submarine hulls and other structures.

2. The Prior Art

Adaptive wings with variable leading and trailing edge devices have been studied to enhance maneuvers, to reduce the critical root bending moment, to reduce drag and to improve gust-alleviating response. Unlike these studies, where shape changes are achieved by moving the leading and trailing edges, the invention enables the use of adaptive wings to improve aircraft performance during transonic cruise, a problem which requires smaller shape changes, but primarily in the region between the leading and trailing edges. The shock induced drag can be reduced dramatically during transonic cruise if the airfoil has the correct shape. Wings that are optimized for a single cruise condition, therefore, usually have high drag at other cruise conditions. However, by adaptively modifying the wing cross section, it is possible to maintain optimum performance as the flight condition changes. The required shape change has been found to be small and therefore achievable.

The principal object of the invention is to provide an apparatus and a method for controlling the shape of structures efficiently, effectively and reliably.

An object of the invention is to provide an apparatus and a method for controlling the shape of structures for adaptive wings with efficiency, effectiveness and reliability.

Another object of the invention is to provide a method for developing the actuator stroke matrix that is used as a gain matrix to compute the strokes and stroke-error correction commands of internal translational actuators to achieve the desired structural shape when actuator stroke control is used.

Still another object of the invention is to provide a method for developing the actuator-load matrix that is used as a gain matrix to compute the loads and load errors of internal translational actuators to achieve the desired structural shapes when actuator load control is used.

Yet another object of the invention is to provide a method which can be applied to structures with stiffness matrices that are singular with the actuators removed.

BRIEF SUMMARY OF THE INVENTION

This invention is a method and apparatus for controlling the shape of a structure containing one or more surfaces. The structure also could contain one or more structural members. One or more translational actuators are internal to the structure and separate the surfaces in the case of structures with more than one surface. Some or all of these members, referred to as translational actuators, are capable of extending and contracting in a controlled manner. Methods have been developed to determine the deflection and load of each actuator to produce any commanded structural shape with minimum shape errors in the sense that the 2-norm (square root of the sum of the squares of the surface error components) is minimized, or minimize the 2-norm of the actuator loads. Hereinafter, the word "norm" as used is intended to mean "2-norm," as is common practice. For the case of redundant actuators, methods have also been developed to determine the deflection and load of each actuator to produce any commanded structural shape with minimum loads and load errors in the sense that the norms of these quantities are minimized. Desired shape changes are automatically analyzed before they are commanded to ensure that the structure will not be overstressed. This is accomplished by a control computer that computes the stress ratios, ratios of stresses to allowable values throughout the structure, that result from shape commands. Also, the stress ratios are continually monitored during operation to ensure that an overstressed condition is not occurring. In the event that either of these tests indicates an overstress, corrective action is automatically commanded by the control computer. Examples of corrective action are proportionally reducing the shape command in response to a predicted overstress and shutting the system down in the event of an unforeseen overstress during operation.

One example of the invention is a variable-shape truss. One or more of these trusses can be used as ribs in adaptive wings to control the cross-sectional shapes of such wings to maximize the lift-to-drag ratio. Each truss has two surfaces that serve as the first and second truss members. Each of a plurality of translational actuators in a structure is affixed to the first and second truss members and the actuators form a truss with the truss members, with alternate ones of the actuators being parallel to each other and the remainder of the actuators being parallel to each other and angularly disposed relative to the alternate ones of the actuators.

In a set of experiments conducted to validate the invention, each of the actuators has a motor for varying the length of the corresponding actuator. In a configuration known as the open-loop configuration, each of a plurality of sensors is positioned in parallel with a corresponding one of the actuators for sensing the deflection of the actuators. In a configuration known as the closed-loop configuration, the deflections of a number of points on the surface were sensed instead of the actuator deflections for use by the control means. Each of a plurality of motor controllers is electrically connected to a corresponding one of the motors of the actuators. Control means electrically connected to the motor controllers and to the sensors commands the shape of the structure, implements control and facilitates the collection of data. The control means inputs user commanded shapes for processing, computing a desired deflection of each of the actuators and transmitting a command resulting from the computing to each of the motor controllers at each of the motor controllers. Each of the motor controllers incorporates analog position error feedback and motor speed regulation to provide the commanded actuator deflection.

In the experiments, each of the actuators has spaced opposite first and second ends, the first end of each of tile actuators being affixed to the first truss member and the second end of each of the actuators being affixed to the second truss member. In both the open-loop and closed-loop configurations, each of the sensors comprises a linear variable differential transformer. The structures are controlled in shape for adaptive wings and the control means includes both analog and digital components. An analog-digital input/ output subsystem (ADIOS) enables communication between digital and analog components and is electrically connected to the sensors and to the motor controllers. ADIOS also communicates with a high speed digital signal processor (DSP) via a high speed private bus. The DSP communicates with a host microprocessor through an industry standard AT bus. Intensive computations, such as the calculation of actuator stroke-error correction commands, are performed in the DSP. The DSP receives desired shapes from the host microprocessor which, in turn, receives such shapes from the user. The actuator stroke-error correction commands, computed in the DSP, are conveyed to ADIOS in digital form. ADIOS transforms these commands to analog form and conveys them via electrical connection to the motor controllers. In both the open-loop and closed-loop configurations, ADIOS receives analog information from the sensors, converts it to digital form, and transmits the information to the DSP via the high speed private bus.

Ratios of stresses to allowable values corresponding to user-specified structural shapes are also computed in the DSP and if any stress is above its allowable value, the commanded shape is proportionally reduced, so that the structure is not overstressed. During operation, the DSP repeatedly computes stresses by multiplying a precomputed stress-ratio matrix with measured shapes and the experiment is shut down automatically if the structure is overstressed for any unforeseen reason.

The microprocessor has sufficient memory to enable recording time history of deflection, force, cover deformation and commanded voltage at a rate of up to 100 Hz. The user commanded shapes transmitted to the digital signal processor are gradually applied over a period of five seconds according to a one minus cosine waveform to limit the dynamic response. The motor controllers regulate the motors with a pulse width modulated 20 KHz sinusoidal wave, whereby the motor controllers function as linear amplifiers.

In an open-loop experiment that was performed with a model of the variable-shape truss, a sensor measured the deflection of each actuator. Desired shapes were commanded and the previously mentioned method was used to compute the actuator lengths required to produce commanded surface deflections. The computation was performed in the digital signal processor, and commanded actuator lengths were transmitted to the motor controllers via the DSP and ADIOS. While surface errors were neither measured nor corrected, so that the overall control loop was open, the loop around each actuator was closed, so that the actuator produced the commanded deflection with relative accuracy. No external loads were applied to the structure. Reasonable surface-shape accuracy was achieved even though surface errors were not corrected. This experiment validated the method of obtaining the control-system gain matrix for achieving desired shapes.

In a closed-loop experiment that was performed with the model of the variable-shape truss, sensors measured the surface deflections instead of the actuator deflections. Unknown external loads were applied to the structure, and desired shapes were commanded. The previously mentioned method was used to compute the errors in the actuator lengths due to the measured errors in the surface deflections. The computation was performed in the DSP, and corrective signals were transmitted to the motor controllers via the high speed private bus and ADIOS to correct the shape. This experiment showed that desired structural shapes could be obtained even when unknown loads were applied to the structure.

BRIEF DESCRIPTION OF THE DRAWINGS

Other objects and features of the present invention will become apparent from the following detailed description considered in connection with the accompanying drawings which disclose embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
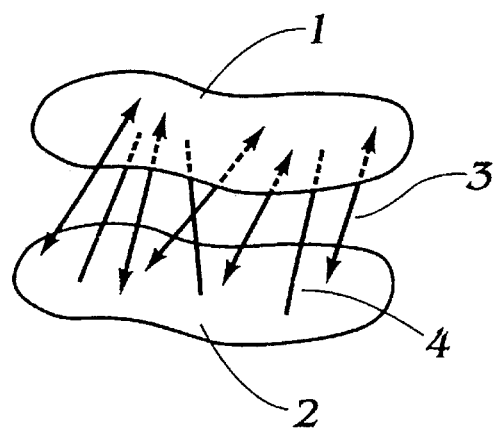
FIG. 1 is a conceptual diagram illustrating the invention for a structure having two surfaces.
Figure 2:
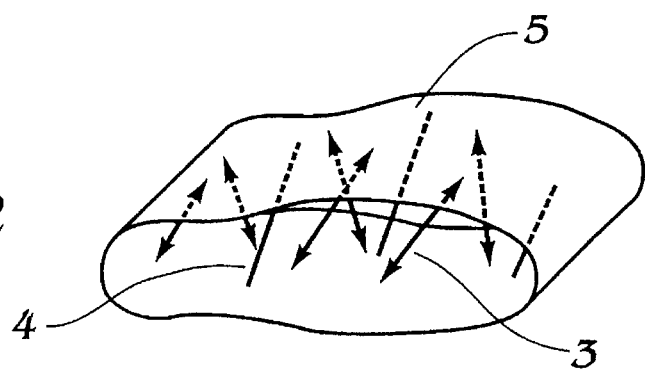
FIG. 2 is a conceptual diagram illustrating the invention for a structure having one surface.

The invention is a method to control the shape of a structure with one or more surfaces and internal actuators. FIG. 1 is a conceptual illustration of the type of structure that has a shape controllable by the method of the invention. The structure of FIG. 1 has two surfaces 1 and 2. In FIGS. 1 and 2, lines with arrowheads on each end such as, for example, line 3, represent one of a plurality of translational actuators that are capable of extending and contracting. A plurality of additional structural members may also be utilized and are represented by lines without arrowheads, such as, for example, line 4. The structure can have any number of controllable surfaces, including one; for example, FIG. 2 shows a structure with only surface 5.

The shapes of the surfaces are controlled by computing the actuator strokes or loads required for achieving specified surface deflections. There are two methods for accomplishing this control. In the actuator stroke-control method, the surface deflections, or deflection errors for closed-loop control, are multiplied by a stroke-control gain matrix which is a function of the properties of the structure with the actuators absent. In the actuator load-control method, the surface deflections, or deflection errors for closed-loop control, are multiplied by a load-control gain matrix which is a function of the properties of the structure with the actuators absent. In either of these methods, different control gain matrices can be developed depending on whether it is desired to minimize actuator loads or surface shape errors.

Figure 3:
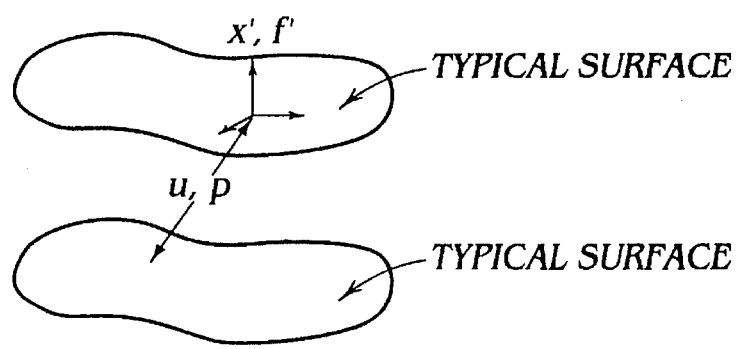
FIG. 3 is a vector diagram of the variables used in the structural analysis and their coordinate systems.

The method for obtaining the stroke-control gain matrix and the load-control gain matrix is described in the following analysis. A typical actuator of the plurality of actuators is shown along a line u,p of FIG. 3 which shows the variables used in the analysis and their coordinate systems. In FIG. 3, x' and f' are the deformations and forces on the structure, respectively, in the global coordinate system. A finite-element model of the structure, without the actuators, is developed to obtain the system stiffness matrix K'. The actuators are represented by the loads that they exert on the structure. The structural equations are $$K'x' = f'_a + f'_e \quad (1)$$

where $f'_a$ is a vector of the actuator loads in global coordinates and $f'_e$ is a vector of aerodynamic and, possibly, other external loads.

If p is a vector of the actuator loads along the actuators, taken as positive when the actuators are in compression and pushing against the structure, then $$f'_a = T'p \quad (2)$$

where T' contains the direction cosines of the actuator loads as well as information specifying that the actuator loads are applied to the structure in equal and opposite pairs. Since virtual work is conserved, $$u = T'^T x' \quad (3)$$

where u is a vector containing the extensions of each actuator.

Next, we select a new set of independent coordinates $x = [x_1 \ x_2]^T$, where $x_1$ contains the coordinates that will be used to define the desired shape and $x_2$ contains the remaining coordinates to form the independent set. For example, if the structure has curved surfaces, $x_1$ could contain coordinates that are normal to the surface. A matrix G is developed to transform to the new coordinate system, i.e., $$x' = Gx = [G_1 \ G_2] \begin{bmatrix} x_1 \\ x_2 \end{bmatrix} \quad (4)$$

Equation (4) is used to transform Equations (1) to (3) and the results are $$Kx = f_a + f_e \quad (5)$$

$$f_a = Tp \quad (6)$$

$$u = T^T x \quad (7)$$

where $$K = G^T K'G \quad (8)$$

$$f_a = G^T f'_a \text{ and } f_e = G^T f'_e \quad (9)$$

$$T = G^T T' \quad (10)$$

From Equations (5) and (6)

$$\begin{bmatrix} K_{11} & K_{12} \\ K_{21} & K_{22} \end{bmatrix} \begin{bmatrix} x_1 \\ x_2 \end{bmatrix} = \begin{bmatrix} T_1 \\ T_2 \end{bmatrix} p + \begin{bmatrix} f_{e1} \\ f_{e2} \end{bmatrix} \quad (11)$$

where the partitioning of K, T and $f_e$ is consistent with the partitioning of x. $K_{22}$ is the stiffness matrix of the structure when the coordinates $x_1$, corresponding to the points used to describe the shape, are held. In practical cases, these extra supports are sufficient to eliminate the semidefinite property of the structure; therefore, $K_{22}$ can be inverted. The second of the equations implied in Equation (11) is solved for $x_2$ and the result is $$x_2 = K^{-1}_{22}(T_2 p - K_{21} x_1 + f_{e2}) \quad (12)$$

This equation is substituted into the first of the equations implied in Equation (11) to obtain $$\overline{T}p = \overline{K}x_1 - \overline{f}_e \quad (13)$$

where $$\overline{T} = T_1 - K_{12} K^{-1}_{22} T_2 \quad (14)$$

$$\overline{K} = K_{11} - K_{12} K^{-1}_{22} f_{e2} \quad (15)$$

$$\overline{f}_e = f_{e1} - K_{12} K^{-1}_{22} f_{e2} \quad (16)$$

To develop the control laws that produce displacements that are a best fit to the specified shape, first Equation (13) is solved for the displacement vector that is achieved $x_1$, and the desired displacement vector $X_{1d}$ is subtracted from both sides of the resulting equation to obtain the following displacement-error vector.

$$x_1 - x_{1d} = \overline{K}^{-1} \overline{T} p - (x_{1d} - \overline{K}^{-1} \overline{f}_e) \quad (17)$$

To minimize the root-mean-square shape error, $\|x_1 - x_{1d}\|$, $$p = V_f x_{1d} - V_f \overline{K}^{-1} \overline{f}_e \quad (18)$$

where $$V_f = (\overline{K}^{-1} \overline{T})^+ \quad (19)$$

As previously, the $^+$ denotes the Moore-Penrose pseudo inverse. Equation (18) is the basis for load control. It can be shown that the actuator load error is related to the shape error by $$p_d - p = V_f(x_{1d} - x_1) \quad (20)$$

Thus, $V_f$ may be used as a gain or actuator load matrix to control actuator loads to achieve minimum root-mean-square shape errors.

For displacement control, a partitioned version of Equation (7) is combined with Equations (12), (13), (14) and (18) to obtain $$u = H_f x_{1d} + U_f \quad (21)$$

where $$H_f = (T^T \overline{K}^{-1} \overline{T} + T^T_2 K^{-1}_{22} T_2) V_f \quad (22)$$

and $$U_f = (T^T - H_f) \overline{K}^{-1} \overline{f}_e + T^T_2 K^{-1}_{22} f_{e2} \quad (23)$$

Equation (21) is the basis for actuator stroke control to achieve minimum root-mean-square shape errors. It can be shown that the actuator stroke error is related to the shape error by $$u_d - u = H_f(x_{1d} - x_1) \qquad (24)$$

Thus, $H_f$ may be used as a gain or actuator stroke matrix to control actuator strokes to achieve minimum root-mean-square shape errors.

Equations (20) and (24) are particularly useful for controlling actuator loads and actuator strokes, respectively, to achieve minimum root-mean-square shape errors, since the external loads, such as air loads, do not appear in these equations and, therefore, do not have to measured.

The finite-element analysis is also used to obtain a stress matrix that provides stresses throughout the structure when the matrix is multiplied by the displacement vector x'. The matrix is transformed to $x_1$ coordinates by using Equation (4) and a Guyan transformation to approximate $x_2$. Finally, each row of the resulting matrix is divided by the allowable stress component for the corresponding finite element, with a sufficient safety factor to allow the Guyan approximation. When this stress-ratio matrix is multiplied by $x_1$, it provides an approximation of the ratio of each stress to its allowable value. Before a shape command is applied, the stress-ratio matrix can be used to predict whether any finite element will be in danger of being overstressed by searching the stress ratios to determine whether any value is greater than one. Also, the stresses can be continuously monitored during shape control, to determine whether there is a danger of an overstress condition due to unforeseen reasons.

The apparatus of the invention controls the shape of structures such as, for example, for adaptive wings, or other structures of aircraft or marine vessels. As an example, the described use of the apparatus is an experimental model of one of several variable-shaped ribs for controlling the shape of structures for adaptive wings. The adaptive wings have first and second surfaces 6 and 7, respectively, as shown in FIGS. 4, 5 and 7A to 7D.

The apparatus for this example comprises first and second truss members 8 and 9, respectively, affixed to the first and second surfaces 6 and 7, respectively, and facing each other in the housing 10 formed by said surfaces (FIGS. 4, 5 and 7A to 7D).

Figure 4:
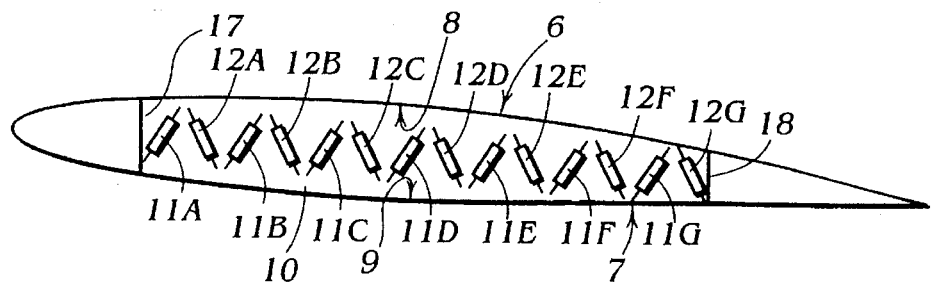
FIG. 4 is a schematic diagram of an embodiment of an adaptive truss of the apparatus of the invention for an experimental model of a wing rib.
Figure 5:
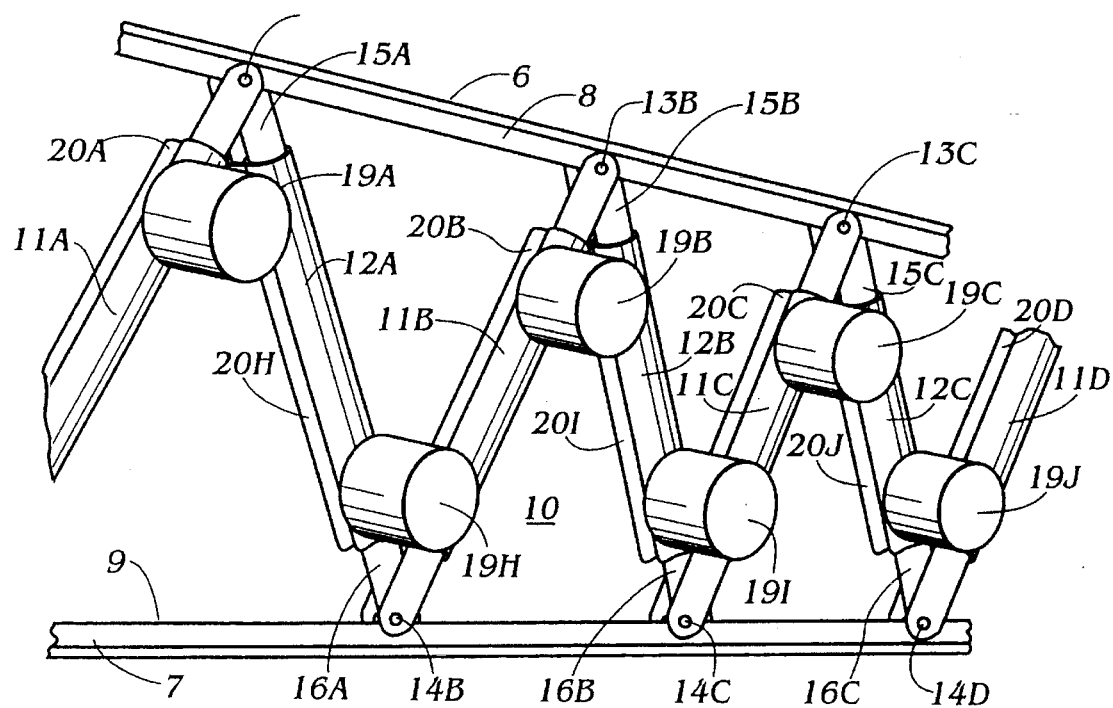
FIG. 5 is a perspective view, on an enlarged scale, of part of the truss of FIG. 4.

A plurality of translational actuators 11A to 11G and 12A to 12G (FIG. 4) are provided in the structure for adaptive wings, shown in FIGS. 4 and 5. Each of the translational actuators 11A to 11G and 12A to 12G has spaced opposite first and second ends. Thus, the translational actuators 11A, 11B, 11C, 11D, 11E, 11F and 11G have first and second ends 13A and 14A, 13B and 14B, 13C and 14C, 13D and 14D, 13E and 14E, 13F and 14F and 13G and 14G, respectively, of which 13A, 13B, 14B, 13C, 14C and 14D are shown in the view of FIG. 5, and the translational actuators 12A, 12B, 12C, 12D, 12E, 12F and 12G have first and second ends 15A and 16A, 15B and 16B, 15C and 16C, 15D and 16D, 15E and 16E, 15F and 16F and 15G and 16G, respectively, of which 15A, 16A, 15B, 16B, 15C and 16C are shown in the view of FIG. 5.

As shown in FIG. 5, the first end of each of the translational actuators 11A to 11G and 12A to 12G is affixed to the first truss member 8 and the second end of each of said translational actuators is affixed to the second truss member 9. The actuators 11A to 11G and 12A to 12G form a truss with the truss members 8 and 9, as shown in FIG. 4. The truss in FIG. 4 also includes additional structural members, spars 17 and 18. Alternate ones 11A, 11B, 11C, 11D, 11E, 11F and 11G of the actuators are parallel to each other (FIG. 4) and the remainder of said actuators 12A, 12B, 12C, 12D, 12E, 12F and 12G are parallel to each other and angularly disposed relative to said alternate ones of said actuators (FIG. 4).

In the apparatus for the experiments, each of the actuators 11A to 11G and 12A to 12G is provided with an electric motor for changing the length of the corresponding actuator. The actuators 11A, 11B, 11C, 11D, 11E, 11F, 11G, 12A, 12B, 12C, 12D, 12E, 12F and 12G have electric motors 19A to 19N, respectively. The electric motors 19A, 19B, 19C, 19H, 19I and 19J are shown in the view of FIG. 5.

A plurality of linear variable differential transformers (LVDT) are provided. A LVDT is an analog displacement sensor that produces a voltage proportional to a change in length.

An open-loop and a closed-loop experiment were performed. In the open-loop experiment, desired shapes were commanded, and multiplied by the gain matrix H to obtain the corresponding actuator lengths. Then, each actuator was commanded to assume its computed length. Surface errors were measured to evaluate the shape-control concept, but the errors were not corrected; therefore, the overall loop was open. However, the loop around each actuator was closed, since actuator-deflection errors were measured and corrected. In this experiment, each of the LVDTs is positioned in parallel with a corresponding one of the translational actuators 11A to 11G and 12A to 12G. The translational actuators 11A, 11B, 11C, 11D, 11E, 11F, 11G, 12A, 12B, 12C, 12D, 12E, 12F and 12G have LVDTs 20A to 20N, respectively. The LVDTs 20A, 20B, 20C, 20D, 20H, 20I and 20J are shown in the view of FIG. 5. The LVDTs sense the deflection of the corresponding translational actuators.

In the closed-loop experiment, desired shapes also were commanded and surface shapes were measured. The surface error, the difference between the desired and measured shapes, was multiplied by the gain matrix H to determine and correct the actuator stroke errors. With the loop closed in this way, accurate shapes were achieved, even with unmeasured external loads, representing aerodynamic, or other, forces and moments, applied to the structure.

Figure 6:
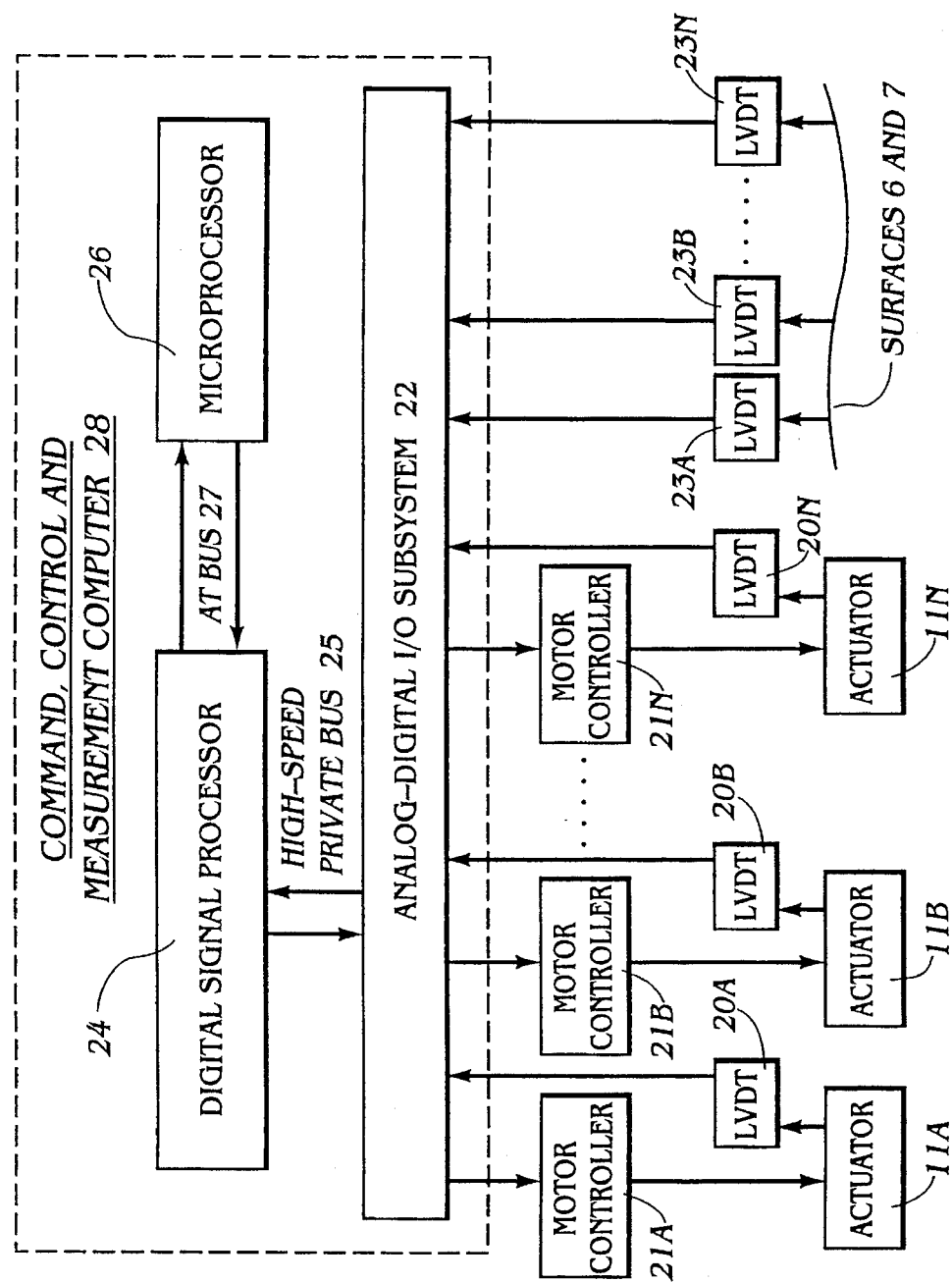
FIG. 6 is a block diagram of the control system for an experiment to validate the invention for controlling the shape of structures.

A plurality of motor controllers 21A to 21N of any suitable known type are electrically connected to electric motors 19A to 19N, respectively, of the translational actuators 11A to 11G and 12A to 12G, respectively (FIG. 6). The motor controllers used in the experiment require analog input. Since the control system for the experimental apparatus, for both the open-loop and closed-loop experiments, includes both analog and digital components, an analog to digital input/output subsystem (ADIOS) 22 of any suitable known type is provided that contains analog to digital converters, digital to analog converters, as well as signal-conditioning circuits, to enable communication between digital and analog components in a known manner. ADIOS 22 is electrically connected to LVDTs 20A to 20N, which sense actuator deflections, additional LVDTS 23A to 23N, which sense structural-surface deflections, as well as motor controllers 21A to 21N. ADIOS 22 communicates with a digital signal processor (DSP) 24 of army suitable known type via a high-speed private bus (DSPLINK) 25. The DSP 24 also communicates with a host microprocessor 26 of any suitable known type through an industry standard AT bus 27. Intensive computations, such as the calculation of actuator stroke error correction commands, are performed in the DSP 24. The DSP 24 receives desired shapes from the microprocessor 26 which, in turn, receives such shapes from the user. The ADIOS 22 conveys commands, such as the actuator stroke error correction commands, via electrical connection to the motor controllers 21A to 21N.

A command, control and measurement computer (CCMC) 28 comprises the DSP 24, the DSPLINK 25, and the ADIOS 22. The CCMC 28 outputs the stroke error-correction commands for each of the actuators 11A to 11N and transmits these commands to each of the motor controllers 21A to 21N. Each of the motor controllers 21A to 21N employs analog motor speed regulation as rate feedback to damp actuator-deflection oscillations.

In the open-loop experiment, the CCMC 28 commands each actuator motion to null its length error by using digitized signals from the LVDT 20A to 20N that is mounted in parallel with that actuator. Thus, for example, referring to FIG. 5, the length error of actuator 11A is nulled by using digitized signals from LVDT 20A. In this case, the information sensed by LVDTs 23A to 23N is only used to evaluate the experimental results. It is used to measure the generated shape, but is not used for control.

In the closed-loop experiment, the CCMC 28 commands actuator motions to null shape errors by utilizing digitized signals from externally mounted LVDTs 23A to 23N in FIG. 6. In this case, the information sensed by LVDTs 20A to 20N is only recorded for future reference. It is not used for control.

In each of these experiments, the commanded shapes were varied slowly and smoothly from the initial shapes to the desired shapes by using a one-minus-cosine waveform to minimize any undesirable dynamic response. Successful testing of both of these experiments has been concluded.

A version of the closed-loop experiment has been designed and will be tested where the external LVDT's, 23A to 23N are replaced by an optical measurement system. In this experiment, a set of light sources are mounted to deformable surfaces 1 and 2. The light sources are viewed by an ordinary charge-coupled-device (CCD) video camera which, in turn, is electrically connected to an electronic device which converts the video signal to digitized coordinates of the light sources and places the information on the DSPLINK for access by the CCMC.

Another variation, which completely eliminates the need for external shape measurements, is being developed. This control scheme would use a direct measure of the desired effect of the shape change and the CCMC would command actuator motions to optimize this measure. For example, in the case of an adaptive aircraft wing, some measure of drag, say throttle setting required to maintain constant air speed, would be fed to the CCMC. A number of small fundamental variations in shape, relative to the nominal airfoil shape, would be implemented, and the corresponding drag would be measured. An optimization algorithm, such as a gradient-based procedure, would then be employed to compute a desired shape that would approximate the shape corresponding to minimum drag for the desired performance. The wing shape is then changed to the computed shape by the above open-loop process, and the process is repeated iteratively to minimize the drag.

In one application, the apparatus of the invention utilizes actuators as truss elements of active ribs to reshape the cross section of an adaptive wing by deforming the structure. Maintaining an optimum wing cross section during transonic cruise can dramatically reduce the shock-induced drag and can result in significant fuel savings and increased range. "Transonic" is that which occurs within the range of speed in which both subsonic and supersonic flow occurs over different sections of the wing, about Mach 0.8 to 1.2.

An adaptive rib model, part of which is shown in FIG. 5, was used to validate the concept. The model was 4 feet wide and 10 inches high. Surface 6 and truss member 8 were constructed as a single integral piece called the upper cap. Similarly, surface 7 and truss member 9 were constructed as a single integral piece called the lower cap. The caps were made of aluminum with T-shaped cross sections 3 inches wide, 0.050 inch thick, forming surfaces 6 and 7, with 0.50 inch by 0.25 inch ribs, forming truss members 8 and 9. In the undeformed condition, the upper and lower surfaces 6 and 7 were flat. Fourteen actuators 11A to 11G and 12A to 12G were used to form the truss structure and create the desired shapes.

A nonlinear finite-element analysis of the model showed that, with actuator load control, nonlinear effects can produce up to 8% errors in the surface for a selected camber deformation. Consequently, actuator deflection control which, it is believed, will produce far more accurate deformations than load control, has been selected to achieve desired upper and lower rib-surface shapes. Since the 14 transverse displacements of the actuator joints were selected to define the surface shapes and there are also 14 actuators, the pseudo inverse, which is used to compute the gain matrix, becomes the conventional inverse. Fourteen inner control loops utilize rate and velocity feedback to control each actuator, so that it achieves its commanded actuator deflection.

As hereinbefore described during the experiments, the command, control and measurement computer 28 (FIG. 6) commands the shape of the test article experiment, implements the control concept and facilitates the collection of data. It also predicts stresses that would result from commanded shapes and computes current stresses throughout the structure and action is automatically taken to prevent an overstressed condition. Other safety features include actuator force and deflection limits.

Figures 7A, 7B, 7C, 7D, 8:
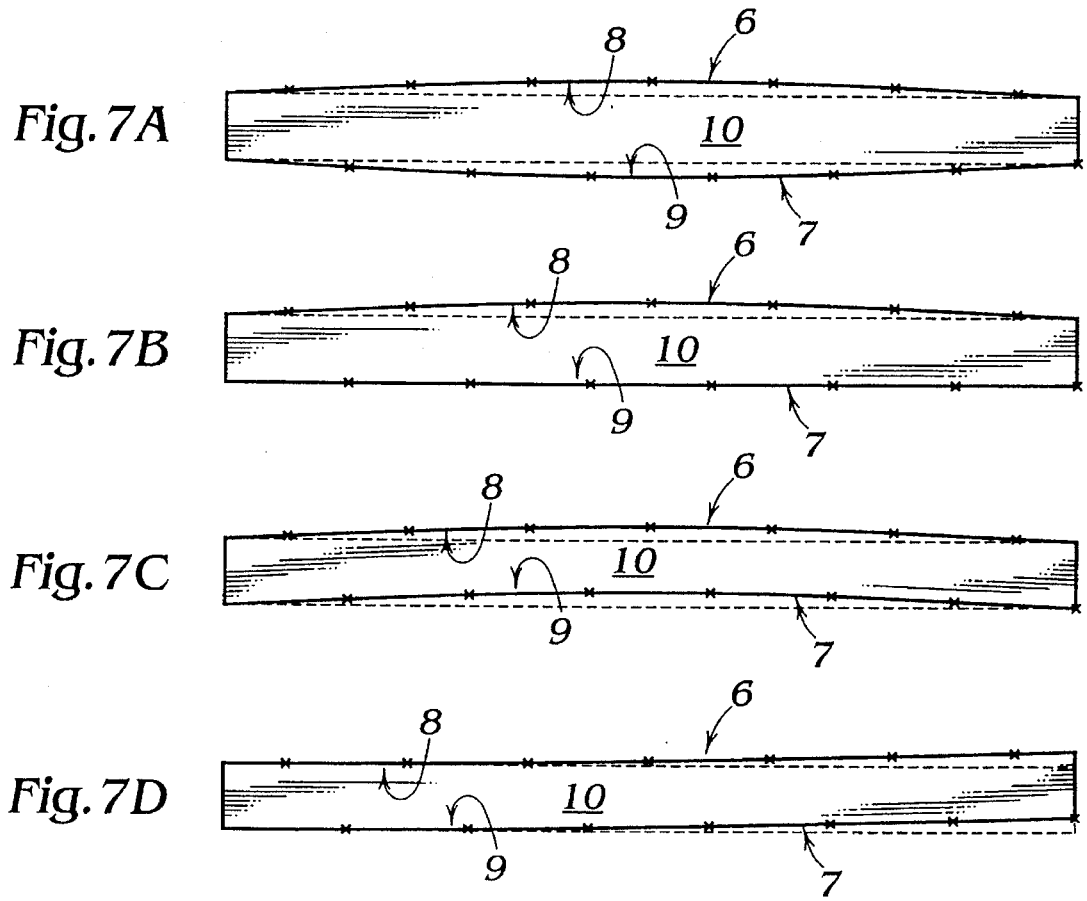
FIGS. 7A, 7B, 7C and 7D are schematic diagrams of test measurements with closed-loop control superimposed upon desired shapes.
FIG. 8 is a table of surface deflection errors with closed-loop control corresponding to the shape of FIG. 7D.

Both the open-loop and closed-loop experiments were performed successfully. To test the method presented, it was attempted to achieve several deformed shapes that were arbitrarily selected. FIGS. 7A to 7D show the closed-loop test measurements imposed on four representative desired shapes. In FIGS. 7A to 7D, the broken lines define the initial undeformed structure, the full lines show the desired shape or structure and the Xs indicate test results. FIG. 7A shows a sine/minus sine configuration where sine indicates a half-sine wave. FIG. 7B shows a sine/flat configuration. FIG. 7C illustrates a sine/sine shape. FIG. 7D shows a racking configuration.

The experimental results agree quite well with the desired shapes. FIG. 8 shows the error for closed-loop control in the racking condition (FIG. 7D) at stations along the upper and lower surfaces corresponding to the Xs in the FIG. The shape amplitude was 1 inch and the errors are generally less than 1% of the amplitude. The errors are thought to be attributable to slop in the joints. Similar accuracy was achieved for each of the shapes of FIG. 7A to 7D. Also, lead weights, totalling approximately 125 lbs., were hung from the lower surface, so that a tension load was distributed normal to the lower surface. Similar surface accuracy was achieved. Since the magnitude and distribution of the load were unknown to the control system, this experiment demonstrates the ability to control shapes in the presence of unknown, or unmeasured, loads such as air loads.

The method of the invention includes the steps of employing actuators between flexible surfaces of a structure with an arbitrary number of surfaces to control the shape of the structure. Also, the method of developing the actuator stroke matrix (i.e., the matrix that transforms shapes to actuator strokes, or shape errors to stroke errors) for minimum actuator load control, minimum actuator load error control and minimum shape error control. The method of developing the actuator load matrix (i.e., the matrix that transforms shapes to actuator loads or shape errors to load errors) for minimum actuator load control, minimum actuator load error control and minimum shape error control is also disclosed. Also, the method of controlling the shape of the structure by processing desired shapes to obtain actuator strokes, loads, stroke errors, and load errors is disclosed. This information is then used to achieve desired deformed shapes. Furthermore, the method of deforming a wing to minimize measured drag directly for the desired performance is disclosed. The method of the invention also includes the method of protecting the structure by computing ratios of stresses to allowable values throughout the structure, such ratios being attributable to shape commands as well as current shapes. These stress ratios are predicated from commanded shapes, computed from current measured shapes and are monitored in real time and corrective action is taken when either a predicted or current stress ratio indicates an overstressed condition.

While only a few embodiments of the present invention lave been shown and described, it is to be understood that many changes and modifications may be made thereunto without departing from the spirit and scope of the invention as defined in the appended claims.

What is claimed is:

1. Apparatus for controlling the shape of a structure, comprising:

a structure having at least one surface;

a plurality of translational actuators capable of varying their lengths between first and second ends of each translational actuator, with the first end of each translational actuator being coupled by a first pivot pin connection to the structure, and the second end of each translational actuator being coupled by a second pivot connection to the at least one surface of said structure, with the actuators changing the shape of said structure by deforming the surface of the structure, wherein deforming the surface of the structure does not include and mean pivoting one or more control surfaces;

a plurality of sensing means for sensing deflections; and control means electrically connected to said sensing means for processing sensed information and computing actuator commands, wherein said control means protects said structure from an overstressed condition caused by internal loads on the structure caused by deforming the shape of the surface of the structure with said actuators by
  (i) multiplying desired surface deflections by a stress matrix and
  (ii) comparing predicted stresses to allowable stresses
  (iii) if said predicted stresses are one of
    (a) equal to said allowable stresses and
    (b) less than said allowable stresses, implementing the deflection command and
  (iv) if any of said predicted stresses are greater than said allowable stresses, modifying said desired surface deflection.

2. Apparatus for controlling the shape of a structure, comprising:

a structure having at least one surface;

a plurality of translational actuators capable of varying their lengths between first and second ends of each translational actuator, with the first end of each translational actuator being coupled by a first pivot pin connection to the structure, and the second end of each translational actuator being coupled by a second pivot pin connection to the at least one surface of said structure, with the actuators changing the shape of said structure by deforming the surface of the structure, wherein deforming the surface of the structure does not include and mean pivoting one or more control surfaces;

a plurality of sensing means for sensing deflections; and control means electrically connected to said sensing means for processing sensed information and computing actuator commands, wherein said control means protects said structure from an overstressed condition caused by internal loads on the structure caused by deforming the shape of the surface of the structure with said actuators by
  (i) multiplying desired surface deflections by a stress-ratio matrix and
  (ii) examining ratios of predicted stresses to allowable stresses
  (iii) if said ratios are one of
    (a) equal to unity and
    (b) less than unity, implementing the deflection command and
  (iv) if any of said ratios are greater than unity, modifying said desired surface deflection.

3. Apparatus for controlling the shape of a structure, comprising:

a structure having at least one surface;

a plurality of translational actuators capable of varying their lengths between first and second ends of each translational actuator, with the first end of each translational actuator being coupled by a first pivot pin connection to the structure, and the second end of each translational actuator being coupled by a second pivot pin connection to the at least one surface of said structure, with the actuators changing the shape of said structure by deforming the surface of the structure, wherein deforming the surface of the structure does not include and mean pivoting one or more control surfaces;

a plurality of sensing means for sensing deflections; and control means electrically connected to said sensing means for processing sensed information and computing actuator commands, wherein said structure is controlled in shape for an adaptive wing and said sensing means senses drag directly and said control means comprises a computer to process measured drag changes due to basic shape changes to compute optimum elastic deformations of the wing shape for minimizing the drag for the desired performance and to compute actuator commands to achieve optimum wing shapes, said computer transmitting commands to said translational actuators to achieve the desired shapes.

4. Apparatus as claimed in claim 3, wherein drag derivatives are formed by dividing the measured drag changes by the amplitude of the basic shape changes and a gradient based optimization method is used to achieve the optimum wing shape.

5. Apparatus for controlling the shape of a structure, comprising:

a structure having at least one surface;

a plurality of translational actuators capable of varying their lengths between first and second ends of each translational actuator, with the first end of each translational actuator being coupled by a first pivot pin connection to the structure, and the second end of each translational actuator being coupled by a second pivot pin connection to the at least one surface of said structure, with the actuators changing the shape of said structure by deforming the surface of the structure, wherein deforming the surface of the structure does not include and mean pivoting one or more control surfaces;

a plurality of sensing means for sensing deflections of the at least one surface; and control means electrically connected to said sensing means for processing sensed information and computing actuator commands, wherein said control means protects said structure from an overstressed condition caused by internal loads on the structure caused by deforming the shape of the surface of the structure with said actuators by multiplying surface deflections by a stress matrix to compute stresses and continuously comparing stresses to allowable stresses.

6. Apparatus for controlling the shape of a structure, comprising:

a structure having at least one surface;

a plurality of translational actuators capable of varying their lengths between first and second ends of each translational actuator, with the first end of each translational actuator being coupled by a first pivot pin connection to the structure, and the second end of each translational actuator being coupled by a second pivot pin connection to the at least one surface of said structure, with the actuators changing the shape of said structure by deforming the surface of the structure, wherein deforming the surface of the structure does not include and mean pivoting one or more control surfaces;

a plurality of sensing means for sensing deflections of the at least one surface; and control means electrically connected to said sensing means for processing sensed information and computing actuator commands, wherein said control means protects said structure from an overstressed condition caused by internal loads on the structure caused by deforming the shape of the surface of the structure with said actuators by multiplying surface deflections by a stress-ratio matrix and continuously monitoring ratios of stresses to allowable stresses.

7. A method for controlling the shape of a structure having at least one surface, said method comprising:

providing a plurality of translational actuators, capable of varying their lengths between first and second ends of each translational actuator, with the first end of each translational actuator being coupled by a first pivot pin connection to the structure, and the second end of each translational actuator being coupled by a second pivot pin connection to the at least one surface of said structure, with the actuators changing the shape of said structure by deforming the surface of the structure, wherein deforming the surface of the structure does not include and mean pivoting one or more control surfaces;

sensing deflection;

processing surface shapes and computing required actuator commands;

developing a stress matrix and predicting stresses by multiplying the stress matrix by desired surface deflections before they are commanded; and comparing said predicted stresses to allowable stresses to protect said structure from an overstressed situation;

commanding said desired surface deflections if said predicted stresses are one of (1) equal to said allowable stresses and (2) less than said allowable stresses; and modifying said desired surface deflection if said predicted stresses are greater than said allowable stresses.

8. A method for controlling the shape of a structure having at least one surface, said method comprising:

providing a plurality of translational actuators, capable of varying their lengths between first and second ends of each translational actuator, with the first end of each translational actuator being coupled by a first pivot pin connection to the structure, and the second end of each translational actuator being coupled by a second pivot pin connection to the at least one surface of said structure, with the actuators changing the shape of said structure by deforming the surface of the structure, wherein deforming the surface of the structure does not include and mean pivoting one or more control surfaces;

sensing deflection;

processing surface shapes and computing required actuator commands;

developing a stress-ratio matrix and predicting ratios of predicted stresses to allowable values by multiplying the stress ratio matrix by desired surface deflections before they are commanded to protect said structure from an overstressed condition;

commanding said desired surface deflections if said predicted stresses are one of (1) equal to said allowable stresses and (2) less than said allowable stresses; and modifying said desired surface deflection if said predicted stresses are greater than said allowable stresses.

9. A method for controlling the shape of a structure having at least one surface, said method comprising:

providing a plurality of translational actuators, capable of varying their lengths between first and second ends of each translational actuator, with the first end of each translational actuator being coupled by a first pivot pin connection to the structure, and the second end of each translational actuator being coupled by a second pivot pin connection to the at least one surface of said structure, with the actuators changing the shape of said structure by deforming the surface of the structure, wherein deforming the surface of the structure does not include and mean pivoting one or more control surfaces;

sensing deflection;

processing surface shapes and computing required actuator commands;

developing a stress matrix which multiplies surface deflections to compute stresses and continuously compares stresses to allowable stresses to protect said structure from an overstressed situation caused by internal loads on the structure caused by deforming the shape of the surface of the structure with said actuators.

10. A method for controlling the shape of a structure having at least one surface, said method comprising:

providing a plurality of translational actuators, capable of varying their lengths between first and second ends of each translational actuator, with the first end of each translational actuator being coupled by a first pivot pin connection to the structure, and the second end of each translational actuator being coupled by a second pivot pin connection to the at least one surface of said structure, with the actuators changing the shape of said structure by deforming the surface of the structure, wherein deforming the surface of the structure does not include and mean pivoting one or more control surfaces;

sensing deflection;

processing surface shapes and computing required actuator commands;

developing a stress-ratio matrix which multiplies surface deflections to compute stress ratios, and continuously monitoring ratios of stresses to allowable values to protect said structure from an overstressed condition caused by internal loads on the structure caused by deforming the shape of the surface of the structure with said actuators.

11. Apparatus for controlling the shape of structures, said structures having at least one surface, said apparatus comprising:

a plurality of translational actuators capable of varying their lengths, said actuators being affixed to surfaces of said structure and said actuators and surfaces forming a structure;

a plurality of sensing means for sensing deflections of the surfaces; and control means electrically connected to said sensing means for processing sensed information and computing actuator commands, said control means employing an actuator stroke matrix as a gain matrix for multiplying surface deflection errors to obtain actuator stroke errors, wherein said stroke matrix is $H_f$ and minimizes surface deflection errors and is given by $H_f = (\overline{T}^T \overline{K}^{-1} \overline{T} + T^T_2 K^{-1}{}_{22} T_2) V_f$, where $\overline{T} = T_1 - K_{12} K^{-1}{}_{22} T_2$, $\overline{K} = K_{11} - K_{12} K^{-1}{}_{22} K^T{}_{12}$, $V_f = (\overline{K}^{-1} \overline{T})^+$, the $^+$ denotes the Moore-Penrose pseudo inverse, $K_{11}$, $K_{12}$, $K_{22}$, $T_1$ and $T_2$ are partitions of K and T, where $$K = \begin{bmatrix} K_{11} & K_{12} \\ K_{21} & K_{22} \end{bmatrix} \text{ and } T = \begin{bmatrix} T_1 \\ T_2 \end{bmatrix},$$

where K is the stiffness matrix of the structure without the actuators in a coordinate system convenient for shape control, T is the matrix that transforms loads in actuator coordinates to the coordinate system that is convenient for shape control, and partitions 1 and 2 of K and T are in accordance with coordinates 1 that are used to specify the desired shape and coordinates 2 that are the remaining coordinates, respectively.

12. Apparatus as claimed in claim 11, wherein the control commands are identical to those produced by employing $H_f$.

13. Apparatus for controlling the shape of structures for adaptive wings, said adaptive wings having first and second surfaces spaced from each other, said apparatus comprising:

a plurality of translational actuators capable of varying their lengths in a structure for adaptive wings, each of said actuators having spaced opposite first and second ends, the first end of each of said actuators being affixed to said first surface and the second end of each of said actuators being affixed to said second surface, said actuators forming a structure with said surfaces;

a plurality of sensors for sensing deflections of said surfaces; and control means transmitting signals to said translational actuators for commanding the shape of said structure for adaptive wings, to implement control, said control means comprising a computer to process commanded shapes, said sensors being electrically connected to said computer, said computer computing actuator commands and transmitting a signal resulting from said computing to each of said translational actuators at each of said translational actuators and commanding translational actuators to achieve the desired wing shape, said control means employing an actuator stroke matrix as a gain matrix which multiplies surface deflection errors to obtain actuator stroke errors, wherein said stroke matrix is $H_f$ and minimizes surface deflection errors and is given by $H_f = (\overline{T}^T \overline{K}^{-1} \overline{T} + T^T_2 K^{-1}{}_{22} T_2) V_f$, where $\overline{T} = T_1 - K_{12} K^{-1}{}_{22} T_2$, $\overline{K} = K_{11} - K_{12} K^{-1}{}_{22} K^T{}_{12}$, $V_f = (\overline{K}^{-1} \overline{T})^+$, the $^+$ denotes the Moore Penrose pseudo inverse, $K_{11}$, $K_{12}$, $K_{22}$, $T_1$ and $T_2$ are partitions of K and T, where K=

$$K = \begin{bmatrix} K_{11} & K_{12} \\ K_{21} & K_{22} \end{bmatrix} \text{ and } T = \begin{bmatrix} T_1 \\ T_2 \end{bmatrix},$$

where K is the stiffness matrix of the structure without the actuators in a coordinate system convenient for shape control, T is the matrix that transforms loads in actuator coordinates to the coordinate system that is convenient for shape control, and partitions 1 and 2 of K and T are in accordance with coordinates 1 that are used to specify the desired shape and coordinates 2 that are the remaining coordinates, respectively.

14. Apparatus as claimed in claim 13, wherein the control commands are identical to those produced by employing $H_f$.

15. A method for controlling the shape of structures, said structures having at least one surface, said method comprising:

affixing a plurality of translational actuators, capable of varying their lengths, to surfaces of said structure to form a structure;

sensing the deflection of said surfaces;

processing surface shapes and computing required actuator commands; and developing an actuator stroke matrix which multiplies surface deflection errors to obtain actuator stroke errors, wherein said stroke matrix is $H_f$ and minimizes surface deflection errors and is given by $H_f = (\overline{T}^T \overline{K}^{-1} \overline{T} + T^T_2 K^{-1}{}_{22} T_2) V_f$, where $\overline{T} = T_1 - K_{12} K^{-1}{}_{22} T_2$, $\overline{K} = K_{11} - K_{12} K^{-1}{}_{22} K^T{}_{12}$, $V_f = (\overline{K}^{-1} \overline{T})^+$, the $^+$ denotes the Moore Penrose pseudo inverse, $K_{11}$, $K_{12}$, $K_{22}$, $T_1$ and $T_2$ are partitions of K and T, where $$K = \begin{bmatrix} K_{11} & K_{12} \\ K_{21} & K_{22} \end{bmatrix} \text{ and } T = \begin{bmatrix} T_1 \\ T_2 \end{bmatrix},$$

where K is the stiffness matrix of the structure without the actuators in a coordinate system convenient for shape control, T is the matrix that transforms loads in actuator coordinates to the coordinate system that is convenient for shape control, and partitions 1 and 2 of K and T are in accordance with coordinates 1 that are used to specify the desired shape and coordinates 2 that are the remaining coordinates, respectively.

16. A method as claimed in claim 15, wherein the control commands are identical to those produced by employing $H_f$.

17. Apparatus for controlling the shape of structures, said structures having at least one surface, said apparatus comprising:

a plurality of translational actuators capable of varying their lengths, said actuators being affixed to surfaces of said structure and said actuators and surfaces forming a structure;

a plurality of sensing means for sensing deflections of said actuators; and control means electrically connected to said sensing means for processing sensed information and computing actuator commands, said control means employing an actuator stroke matrix as a gain matrix for multiplying desired surface deflections to obtain desired actuator strokes, wherein said stroke matrix is $H_f$ and minimizes surface deflection errors and is given by $H_f = (\overline{T}^T \overline{K}^{-1} \overline{T} + T^T_2 K^{-1}_{22} T_2) V_f$, where $\overline{T} = T_1 - K_{12} K^{-1}_{22} T_2$, $\overline{K} = K_{11} - K_{12} K^{-1}_{22} K^T_{12}$, $V_f = (\overline{K}^{-1} \overline{T})^+$, the $^+$ denotes the Moore Penrose pseudo inverse, $K_{11}$, $K_{12}$, $K_{22}$, $T_1$ and $T_2$ are partitions of K and T, where $$K = \begin{bmatrix} K_{11} & K_{12} \\ K_{21} & K_{22} \end{bmatrix} \text{ and } T = \begin{bmatrix} T_1 \\ T_2 \end{bmatrix},$$

where K is the stiffness matrix of the structure without the actuators in a coordinate system convenient for shape control, T is the matrix that transforms loads in actuator coordinates to the coordinate system that is convenient for shape control, and partitions 1 and 2 of K and T are in accordance with coordinates 1 that are used to specify the desired shape and coordinates 2 that are the remaining coordinates, respectively.

18. Apparatus as claimed in claim 17, wherein the control commands are identical to those produced by employing $H_f$.

19. Apparatus for controlling the shape of structures for adaptive wings, said adaptive wings having first and second surfaces spaced from each other, said apparatus comprising:

a plurality of translational actuators capable of varying their lengths in a structure for adaptive wings, each of said actuators having spaced opposite first and second ends, the first end of each of said actuators being affixed to said first surface and the second end of each of said actuators being affixed to said second surface, said actuators forming a structure with said surfaces;

a plurality of sensors for sensing deflections of said actuators; and control means transmitting signals to said translational actuators for commanding the shape of said structure for adaptive wings, to implement control, said control means comprising a computer to process commanded shapes, said sensors being electrically connected to said computer, said computer computing actuator commands and transmitting a signal resulting from said computing to each of said translational actuators at each of said translational actuators and commanding translational actuators to achieve the desired wing shape, said control means employing an actuator stroke matrix as a gain matrix which multiplies desired surface deflections to obtain desired actuator strokes, wherein said stroke matrix is $H_f$ and minimizes surface deflection errors and is given by $H_f = (\overline{T}^T \overline{K}^{-1} \overline{T} + T^T_2 K^{-1}_{22} T_2) V_f$, where $\overline{T} = T_1 - K_{12} K^{-1}_{22} T_2$, $\overline{K} = K_{11} - K_{12} K^{-1}_{22} K^T_{12}$, $V_f = (\overline{K}^{-1} \overline{T})^+$, the $^+$ denotes the Moore Penrose pseudo inverse, $K_{11}$, $K_{12}$, $K_{22}$, $T_1$ and $T_2$ are partitions of K and T, where $$K = \begin{bmatrix} K_{11} & K_{12} \\ K_{21} & K_{22} \end{bmatrix} \text{ and } T = \begin{bmatrix} T_1 \\ T_2 \end{bmatrix},$$

where K is the stiffness matrix of the structure without the actuators in a coordinate system convenient for shape control, T is the matrix that transforms loads in actuator coordinates to the coordinate system that is convenient for shape control, and partitions 1 and 2 of K and T are in accordance with coordinates 1 that are used to specify the desired shape and coordinates 2 that are the remaining coordinates, respectively.

20. Apparatus for controlling the shape of structures, said structures having at least one surface, said apparatus comprising:

a plurality of translational actuators capable of varying their lengths, said actuators being affixed to surfaces of said structure and said actuators and surfaces forming a structure;

a plurality of sensing means for sensing deflections of the surfaces; and control means electrically connected to said sensing means for processing sensed information and computing actuator commands, said control means employing an actuator load matrix as a gain matrix for multiplying surface deflection errors to obtain actuator load errors, wherein said load matrix is $V_f$ and minimizes surface deflection errors and is given by $V_f = (\overline{K}^{-1} \overline{T})^+$, where the $^+$ denotes the Moore Penrose pseudo inverse $\overline{T} = T_1 - K_{12} K^{-1}_{22} T_2$, $\overline{K} = K_{11} - K_{12} K^{-1}_{22} K^T_{12}$, $K_{11}$, $K_{12}$, $K_{22}$, $T_1$ and $T_2$ are partitions of K and T, where $$K = \begin{bmatrix} K_{11} & K_{12} \\ K_{21} & K_{22} \end{bmatrix} \text{ and } T = \begin{bmatrix} T_1 \\ T_2 \end{bmatrix},$$

where K is the stiffness matrix of the structure without the actuators in a coordinate system convenient for shape control, T is the matrix that transforms loads in actuator coordinates to the coordinate system that is convenient for shape control, and partitions 1 and 2 of K and T are in accordance with coordinates 1 that are used to specify the desired shape and coordinates 2 that are the remaining coordinates, respectively.

21. Apparatus as claimed in claim 20, wherein the control commands are identical to those produced by employing $V_f$.

22. Apparatus for controlling the shape of structures for adaptive wings, said adaptive wings having first and second surfaces spaced from each other, said apparatus comprising:

a plurality of translational actuators capable of varying their lengths in a structure for adaptive wings, each of said actuators having spaced opposite first and second ends, the first end of each of said actuators being affixed to said first surface and the second end of each of said actuators being affixed to said second surface, said actuators forming a structure with said surfaces;

a plurality of sensors for sensing deflections of said surfaces; and control means transmitting signals to said translational actuators for commanding the shape of said structure for adaptive wings, to implement control, said control means comprising a computer to process commanded shapes, said sensors being electrically connected to said computer, said computer computing actuator commands and transmitting a signal resulting from said computing to each of said translational actuators at each of said translational actuators and commanding translational actuators to achieve the desired wing shape, said control means employing an actuator load matrix as a gain matrix which multiplies surface deflection errors to obtain actuator load errors, wherein said load matrix is $V_f$ and minimizes surface deflection errors and is given by $V_f = (\overline{K}^{-1} \overline{T})^+$, where the $^+$ denotes the Moore Penrose pseudo inverse $\overline{T} = T_1 - K_{12} K^{-1}_{22} T_2$, $\overline{K} = K_{11} - K_{12} K^{-1}_{22} K^T_{12}$, $K_{11}$, $K_{12}$, $K_{22}$, $T_1$ and $T_2$ are partitions of K and T, where $$K = \begin{bmatrix} K_{11} & K_{12} \\ K_{21} & K_{22} \end{bmatrix} \text{ and } T = \begin{bmatrix} T_1 \\ T_2 \end{bmatrix},$$

where K is the stiffness matrix of the structure without the actuators in a coordinate system convenient for shape control, T is the matrix that transforms loads in actuator coordinates to the coordinate system that is convenient for shape control, and partitions 1 and 2 of K and T are in accordance with coordinates 1 that are used to specify the desired shape and coordinates 2 that are the remaining coordinates, respectively.

23. Apparatus as claimed in claim 22, wherein the control commands are identical to those produced by employing $V_f$.

24. A method for controlling the shape of structures, said structures having at least one surface, said method comprising:

affixing a plurality of translational actuators, capable of varying their lengths, to surfaces of said structure to form a structure;

sensing the deflection of said surfaces;

processing surface shapes and computing required actuator commands; and developing an actuator load matrix which multiplies surface deflection errors to obtain actuator load errors, wherein said load matrix is $V_f$ and minimizes surface deflection errors and is given by $V_f = (\overline{K}^{-1} \overline{T})^+$, where the $^+$ denotes the Moore Penrose pseudo inverse, $\overline{T} = T_1 - K_{12} K^{-1}_{22} T_2$, $\overline{K} = K_{11} - K_{12} K^{-1}_{22} K^T_{12}$, $K_{11}$, $K_{12}$, $K_{22}$, $T_1$ and $T_2$ are partitions of K and T, where $$K = \begin{bmatrix} K_{11} & K_{12} \\ K_{21} & K_{22} \end{bmatrix} \text{ and } T = \begin{bmatrix} T_1 \\ T_2 \end{bmatrix},$$

where K is the stiffness matrix of the structure without the actuators in a coordinate system convenient for shape control, T is the matrix that transforms loads in actuator coordinates to the coordinate system that is convenient for shape control, and partitions 1 and 2 of K and T are in accordance with coordinates 1 that are used to specify the desired shape and coordinates 2 that are the remaining coordinates, respectively.

25. A method as claimed in claim 24, wherein the control commands are identical to those produced by employing $V_f$ as defined.

26. Apparatus for controlling the shape of structures, said structures having at least one surface, said apparatus comprising:

a plurality of translational actuators capable of varying their lengths, said actuators being affixed to surfaces of said structure and said actuators and surfaces forming a structure;

a plurality of sensing means for sensing deflections of said actuators; and control means electrically connected to said sensing means for processing sensed information and computing actuator commands, said control means employing an actuator load matrix as a gain matrix for multiplying desired surface deflections to obtain desired actuator loads, wherein said load matrix is $V_f$ and minimizes surface deflection errors and is given by $V_f = (\overline{K}^{-1} \overline{T})^+$, where the $^+$ denotes the Moore Penrose pseudo inverse, $\overline{T} = T_1 - K_{12} K^{-1}_{22} T_2$, $\overline{K} = K_{11} - K_{12} K^{-1}_{22} K^T_{12}$, $K_{11}$, $K_{12}$, $K_{22}$, $T_1$ and $T_2$ are partitions of K and T, where $$K = \begin{bmatrix} K_{11} & K_{12} \\ K_{21} & K_{22} \end{bmatrix} \text{ and } T = \begin{bmatrix} T_1 \\ T_2 \end{bmatrix},$$

where K is the stiffness matrix of the structure without the actuators in a coordinate system convenient for shape control, T is the matrix that transforms loads in actuator coordinates to the coordinate system that is convenient for shape control, and partitions 1 and 2 of K and T are in accordance with coordinates 1 that are used to specify the desired shape and coordinates 2 that are the remaining coordinates, respectively.

27. Apparatus as claimed in claim 26, wherein the control commands are identical to those produced by employing $V_f$.

* * * * *